(12) United States Patent
Geva et al.

(10) Patent No.: US 8,550,474 B2
(45) Date of Patent: Oct. 8, 2013

(54) MODULAR SHOPPING CART

(75) Inventors: Rafi Geva, Shoham (IL); David Chiche, Shoham (IL)

(73) Assignee: Greencart Int Ltd., Airport (IL)

( * ) Notice: Subject to any disclaimer, the term of this patent is extended or adjusted under 35 U.S.C. 154(b) by 0 days.

(21) Appl. No.: 13/148,315

(22) PCT Filed: Feb. 25, 2010

(86) PCT No.: PCT/IB2010/050819
§ 371 (c)(1),
(2), (4) Date: Aug. 8, 2011

(87) PCT Pub. No.: WO2010/100583
PCT Pub. Date: Sep. 10, 2010

(65) Prior Publication Data
US 2012/0013104 A1    Jan. 19, 2012

Related U.S. Application Data

(60) Provisional application No. 61/208,836, filed on Mar. 2, 2009.

(51) Int. Cl.
*B62B 1/00*    (2006.01)
(52) U.S. Cl.
USPC .............................. 280/35; 280/638; 280/651
(58) Field of Classification Search
USPC ............ 280/47.17, 47.18, 47.19, 47.2, 47.24, 280/47.26, 47.28, 63, 79.2, DIG. 6
See application file for complete search history.

(56) References Cited

U.S. PATENT DOCUMENTS

| | | | |
|---|---|---|---|
| 4,047,724 A * | 9/1977 | Shaffer | 280/5.22 |
| 4,185,848 A * | 1/1980 | Holtz | 280/652 |
| 4,412,689 A | 11/1983 | Lee | |
| 5,178,309 A | 1/1993 | Bicheler et al. | |
| 5,595,395 A * | 1/1997 | Wilson | 280/47.26 |
| 5,662,235 A | 9/1997 | Nieto | |
| 5,836,596 A | 11/1998 | Wanzl | |
| 5,865,449 A | 2/1999 | Castaneda | |
| 5,927,745 A | 7/1999 | Cunningham | |
| 5,988,671 A * | 11/1999 | Abelbeck et al. | 280/649 |
| 6,112,857 A * | 9/2000 | Morrison | 186/61 |
| 6,328,329 B1 * | 12/2001 | Smith | 280/639 |
| 6,587,835 B1 | 7/2003 | Treyz et al. | |
| 6,910,696 B2 * | 6/2005 | Bargery et al. | 280/30 |

(Continued)

FOREIGN PATENT DOCUMENTS

CN    2535299 Y    2/2003

OTHER PUBLICATIONS

International Application PCT/IB2011/053833 filed Sep. 1, 2011.
International Application PCT/IB2010/050819 Search Report dated Jul. 9, 2010.

(Continued)

*Primary Examiner* — John Walters
*Assistant Examiner* — James Triggs
(74) *Attorney, Agent, or Firm* — D. Kligler I.P. Services Ltd.

(57) ABSTRACT

A cart (20, 50, 90) includes a plurality of removable baskets (24, 54, 94) having respective rims (40, 76). A foldable frame (22, 52, 92) has folded and unfolded configurations, and includes multiple wheels (32, 65, 108, 110) and an upper supporting structure (36, 58, 98), which is capable, when the frame is in the unfolded configuration, of supporting the baskets side-by-side by the respective rims.

13 Claims, 11 Drawing Sheets

(56) References Cited

U.S. PATENT DOCUMENTS

2005/0023783 A1* 2/2005 Chen .................... 280/47.38
2007/0096437 A1   5/2007 Watson
2008/0093824 A1* 4/2008 Chen et al. ................ 280/642

OTHER PUBLICATIONS

International Application PCT/IB2011/053833 Search report May 21, 2012.
Chinese Patent Application # 201080010206.2 dated Dec. 21, 2012.

* cited by examiner

MODULAR SHOPPING CART

CROSS-REFERENCE TO RELATED APPLICATION

This application claims the benefit of U.S. Provisional Patent Application 61/208,836, filed Mar. 2, 2009, which is incorporated herein by reference.

FIELD OF THE INVENTION

The present invention relates generally to hand-propelled vehicles, and specifically to shopping carts.

BACKGROUND OF THE INVENTION

Hundreds of millions of shopping carts are in use in supermarkets around the world. In typical use, the shopper fills the cart with goods in the store, empties the cart at the checkout counter, and then loads the goods into bags to take them home. The bags may be disposable, but reusable bags are coming into increasing use due to environmental pressures. For small quantities of goods, some shoppers use their own trolleys, which typically consist of a flexible sack mounted on a folding wheeled frame.

SUMMARY OF THE INVENTION

Embodiments of the present invention that are described hereinbelow provide shopping carts with enhanced convenience and flexibility, as well as methods for using such carts in transporting goods both inside and out of the store.

There is therefore provided, in accordance with an embodiment of the present invention, a cart, including a plurality of removable baskets having respective rims. A foldable frame has folded and unfolded configurations, and includes multiple wheels and an upper supporting structure, which is capable, when the frame is in the unfolded configuration, of supporting the baskets side-by-side by the respective rims.

Typically, the frame in the unfolded configuration is capable of supporting three or more of the baskets side-by-side by the respective rims. The baskets may include handles for use in carrying the baskets when removed from the frame. Additionally or alternatively, at least one of the baskets includes a removable partition, which divides the at least one of the baskets into two or more compartments. Further additionally or alternatively, the cart may include an infant seat configured to be supported by the frame in place of one of the baskets. The infant seat may include a removable panel, which is configured to be inserted into the infant seat in order to convert the infant seat to a closed container for use as an additional basket.

In disclosed embodiments, the frame includes at least one wheel strut, having a lower end connected to at least one of the wheels and having an upper end opposite the lower end, and a joint, which couples the upper supporting structure to the upper end of the at least one wheel strut, wherein the frame is configured to fold about the joint so as to bring the wheels into proximity with the upper supporting structure. In one embodiment, the at least one wheel strut includes front and rear wheel struts, and both the front and rear wheel struts are configured to rotate about the joint as the cart is folded and unfolded. Additionally or alternatively, the upper supporting structure is hinged so as to collapse toward the joint as the cart is folded. The at least one wheel strut has a length from the upper end to the lower end, and the joint and the at least one of the wheels have respective radii, and in some embodiments, the frame is configured to fold about the joint so as to have a maximal dimension in the folded configuration that is no greater than the length of the at least one wheel strut taken together with the respective radii of the joint and at least one of the wheels.

Additionally or alternatively, the at least one wheel strut includes a hinge, in addition to the joint, for rotating at least a part of the at least one wheel strut between the folded and unfolded configurations.

In some embodiments, the frame includes a lower supporting structure, which is configured to hold at least one additional removable basket below the upper supporting structure. Additionally or alternatively, the frame includes a mount for a mobile electronic device, for providing information to a user of the cart in a store regarding goods sold in the store.

There is also provided, in accordance with an embodiment of the present invention, a method for transportation of goods, including assembling a cart by mounting a plurality of removable baskets on a foldable frame having multiple wheels. The baskets are filled with goods for purchase in a store while wheeling the assembled cart through the store. The assembled cart is then wheeled out of the store with the goods in the baskets after purchasing the goods. After exiting the store, the baskets containing the goods are removed from the frame and loaded into a vehicle. After removing the baskets, the frame is folded and stowed in the vehicle.

The method may include, after loading the removed baskets into the vehicle and stowing the folded frame, traveling in the vehicle to a destination and, at the destination, reassembling the cart by unfolding the frame, remounting the baskets containing the goods onto the frame, and wheeling the cart to a desired location. Additionally or alternatively, the method may include, prior to exiting the store, unloading the goods from the baskets at a check-out location in order to complete the purchase, and then reloading the goods into the baskets.

The present invention will be more fully understood from the following detailed description of the embodiments thereof, taken together with the drawings in which:

DETAILED DESCRIPTION OF EMBODIMENTS

Overview

Figure 1:
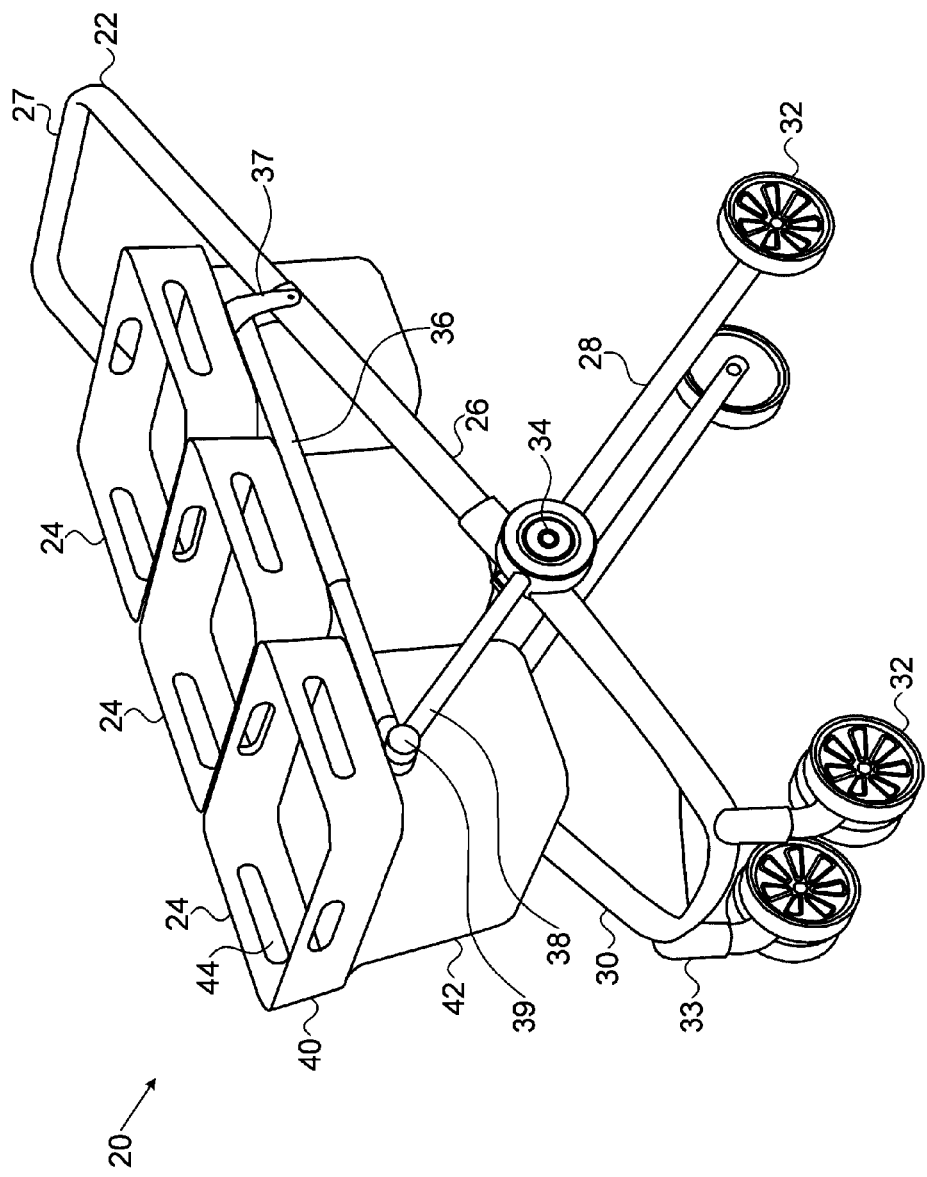
FIG. 1 is a schematic, pictorial illustration of a shopping cart, in accordance with an embodiment of the present invention.

Embodiments of the present invention that are described hereinbelow provide an "end-to-end" solution for transporting goods during and after shopping, from the aisles of the store to the user's home. The solution is economical, convenient and friendly to the environment, since it is based on reusable baskets rather than disposable bags.

In a typical use scenario, the shopper has his or her own cart with a compatible set of baskets, which can be kept at home or in the shopper's vehicle. The cart comprises a foldable frame, which has an upper supporting structure capable (in the unfolded configuration) of supporting multiple baskets side-by-side. When not in use, the frame folds to a size small enough to fold conveniently into the trunk of an automobile. Details of the design of such a frame, in several different embodiments, are described with reference to the figures hereinbelow.

Upon arriving at the store, the shopper unfolds the frame and mounts the baskets on the supporting structure. While wheeling the cart through the store, the shopper fills the baskets with goods for purchase. The use of multiple side-by-side baskets makes it possible for the cart to hold a large quantity of goods, while keeping the quantity (and weight) in each individual basket within reasonable bounds. It also enables the shopper to pre-sort the goods by type while shopping if desired. After collecting the desired goods, the shopper proceeds to a check-out location, where the baskets may be unloaded one-by-one so that the clerk can record the charges, and are then reloaded with the same goods. Alternatively, when more advanced check-out technologies are used, such as radio frequency identification (RFID) of the goods in the baskets, the goods may not need to be unloaded from the baskets at checkout.

After check-out, the shopper wheels the cart out of the store to his or her vehicle, with the goods in the baskets. The shopper lifts the baskets out of the frame and loads them into the vehicle, and then folds up the frame and loads it into the vehicle, as well, and drives away. At the destination (such as the shopper's home), the shopper may simply lift the baskets out of the vehicle and carry them to the desired location. Alternatively, the shopper may again reassemble the cart, remount the baskets, and wheel the cart to the desired location.

As yet another alternative, for stores that are within walking distance of the shopper's home, the shopper may simply wheel the cart from home to the store, and then may wheel the cart, filled with goods, from the store back home. The cart is also suitable for elevators.

The above use scenarios are made possible by the novel principles of cart design that are exemplified in the embodiments described below. These designs enable the frame to be folded compactly, and to roll robustly over various types of surfaces when unfolded, even when the baskets carry heavy loads (possibly as much as 100 kg all together). The carts in the embodiments that follow, however, are not limited to the particular use scenarios described above and may alternatively be used in other applications in which a modular, foldable cart can be advantageous.

Because the shopping cart belongs to the individual shopper, it may address some shoppers' hygiene-related concerns about shared supermarket shopping carts, and can also be personalized in ways that conventional shopping carts are not. For example, the shopper can choose a cart of a desired size and color, along with optional accessories. The cart may optionally include a device, such as a radio-frequency identification (RFID) tag, that identifies the shopper. Sensors in the store may read this tag and use the identification to present personalized promotions (possibly on a mobile electronic device, as described below), to bill the shopper for purchases, or to enhance the shopping experience in other ways. Alternatively, the mobile electronic device itself, such as the shopper's mobile phone, may be used to identify the shopper for these purposes.

Embodiment I

FIG. 1 is a schematic, pictorial illustration of a shopping cart 20, in accordance with an embodiment of the present invention. Cart 20 comprises a foldable frame 22 and multiple baskets 24, which mount side-by-side on an upper supporting structure of the frame. This supporting structure comprises a crossbar 36, which is connected by a hinge 37 to a rear support 26 and by a joint 39 to a forward support 38. A handle 27 for use in pushing the cart extends backward from rear support 26.

Cart 20 comprises wheels 32 at the lower ends of rear wheel struts 28 and forward wheel struts 30. The front wheels are mounted on swivels 33 for easy steering. The wheels are typically of robust design, to facilitate wheeling the cart over different sorts of surfaces, both inside and outside the store, and may include a variable speed mechanism (not shown in the figures) that adapts to different surface conditions. The upper ends of the wheel struts are coupled to the upper supporting structure by a joint 34. This joint (along with its twin on the opposite side of the cart, not shown in this figure) defines a single axis around which the elements of frame 22, including wheel struts 28 and 30 and forward support 38, rotate as the frame is folded, as shown in the figures that follow. This single-axis design is advantageous in terms of ease of assembly and compact folding of the frame.

Baskets 24 comprise a rim 40, which is supported by crossbar 36, and handles 44 for lifting the baskets and carrying them when they are separated from the frame. Although three such baskets are shown in this figure (as well as in the embodiments that follow), with respective volumes of about forty liters, larger numbers of smaller baskets—possibly as many as twenty baskets—may be mounted side-by-side on frame 22. Furthermore, the shopper may mount only one or two of the baskets on the frame when shopping for only a small number of items. Baskets 24 comprise containers 42, which may be of rigid construction, as shown in the figures, or may alternatively be made from flexible materials. Additionally or alternatively, rims 40 of baskets 24 may be flexible or foldable (in accordion fashion, for example) for compact storage and to allow a larger number of baskets to be mounted together on the cart when desired. As a further option, the baskets may have an oval frame that permits them to nest one in another.

In addition to the baskets on the upper supporting structure, an additional basket or other container may be mounted on a lower supporting structure (not shown in this figure) between wheel struts 28 and 30. As one option, a flexible mesh or fabric may be stretched between the forward and rear wheel struts.

Figure 2A:
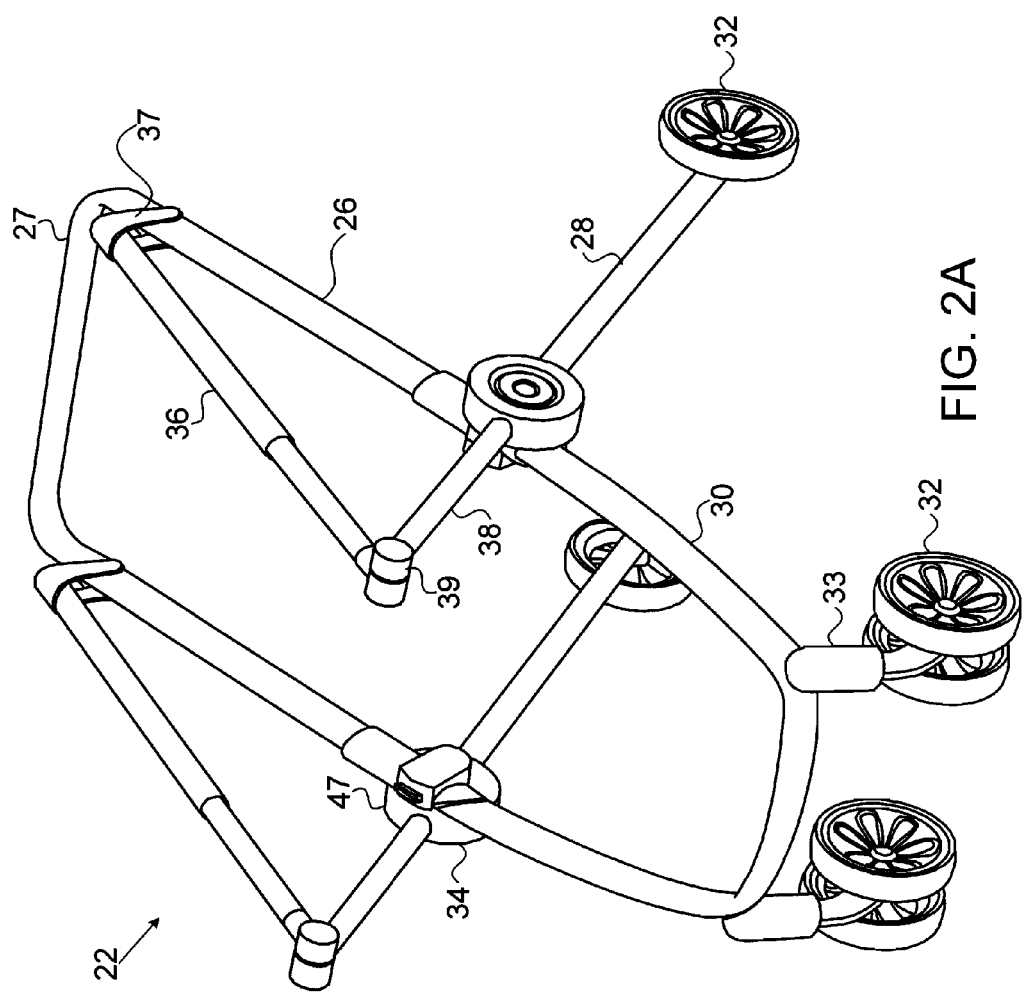
FIGS. 2A-2D are schematic, pictorial views of a shopping cart frame in successive stages of folding, in accordance with an embodiment of the present invention.
Figure 2B:
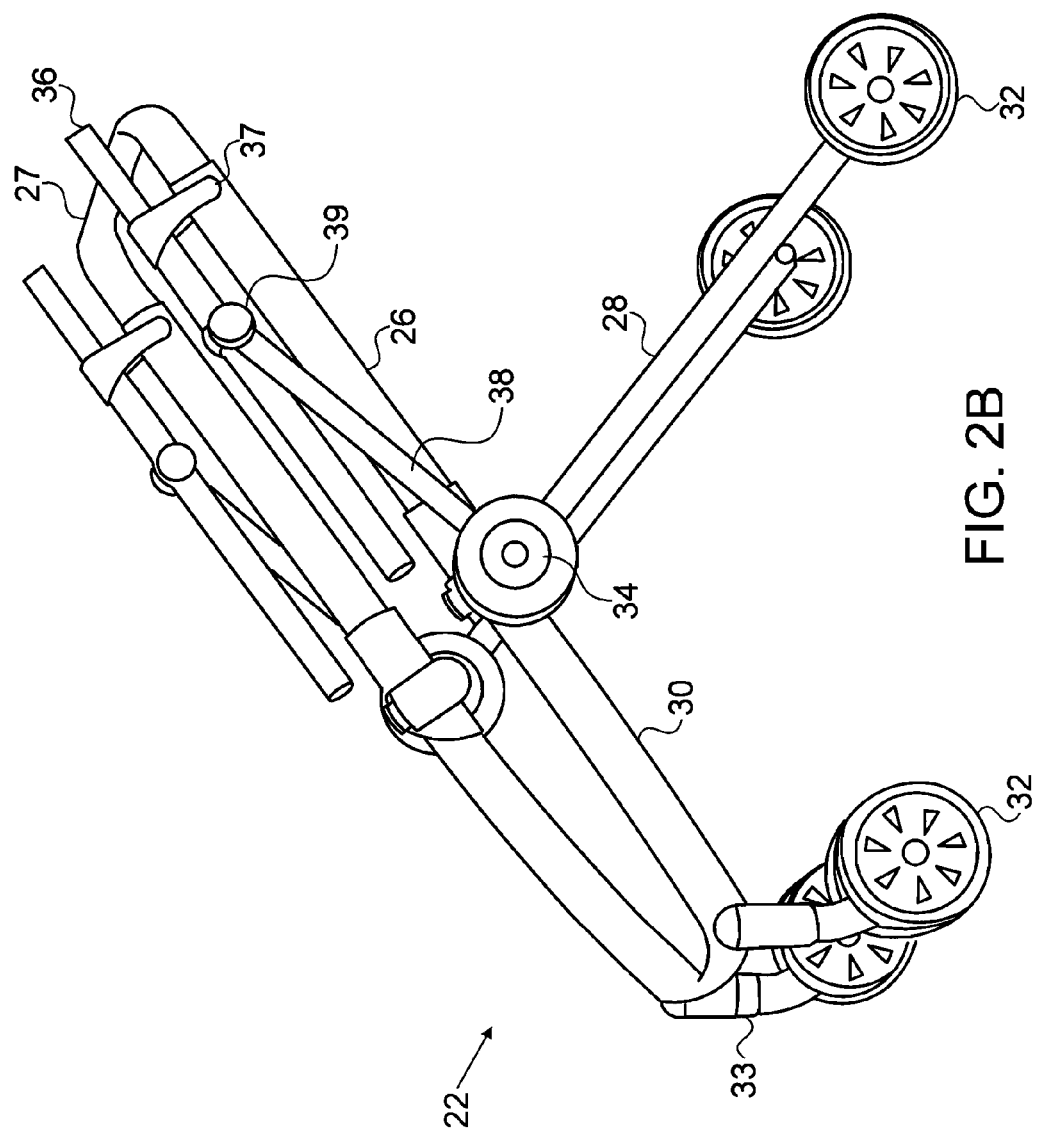

FIGS. 2A-2D are schematic, pictorial views of frame 22 in successive stages of folding, in accordance with an embodiment of the present invention. To begin the process, the shopper removes baskets 24 and then presses a release catch 47, which may conveniently be located on one or both of joints 34, as shown in FIG. 2A. Handle 27 then collapses telescopically inward into rear supports 26, as shown in this figure. Next, forward supports 38 rotate rearward around joints 34, as shown in FIG. 2B. Hinges 37 allow crossbars 36 to fold downward toward rear supports 26, while joints 39 slide upward along the crossbars, whereby the entire upper supporting structure collapses toward joint 34.

Figure 2C:
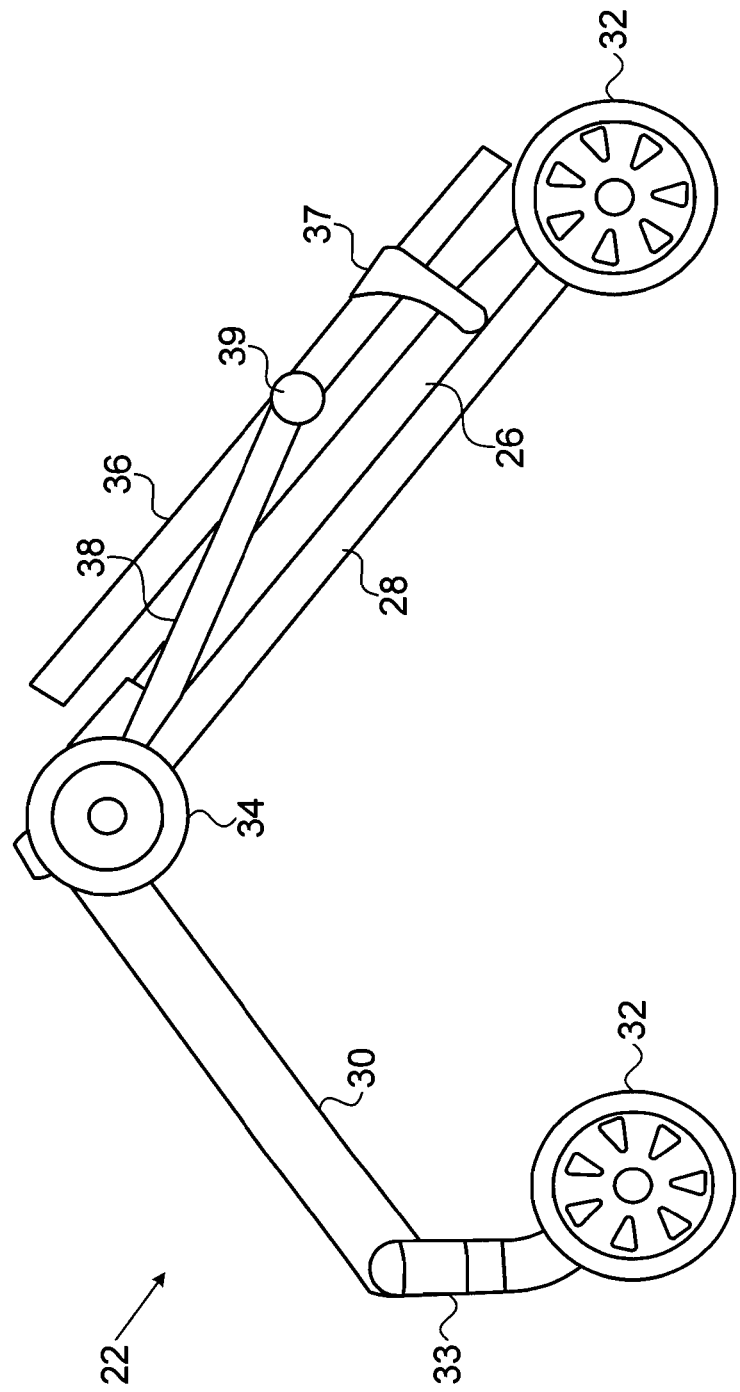
Figure 2D:
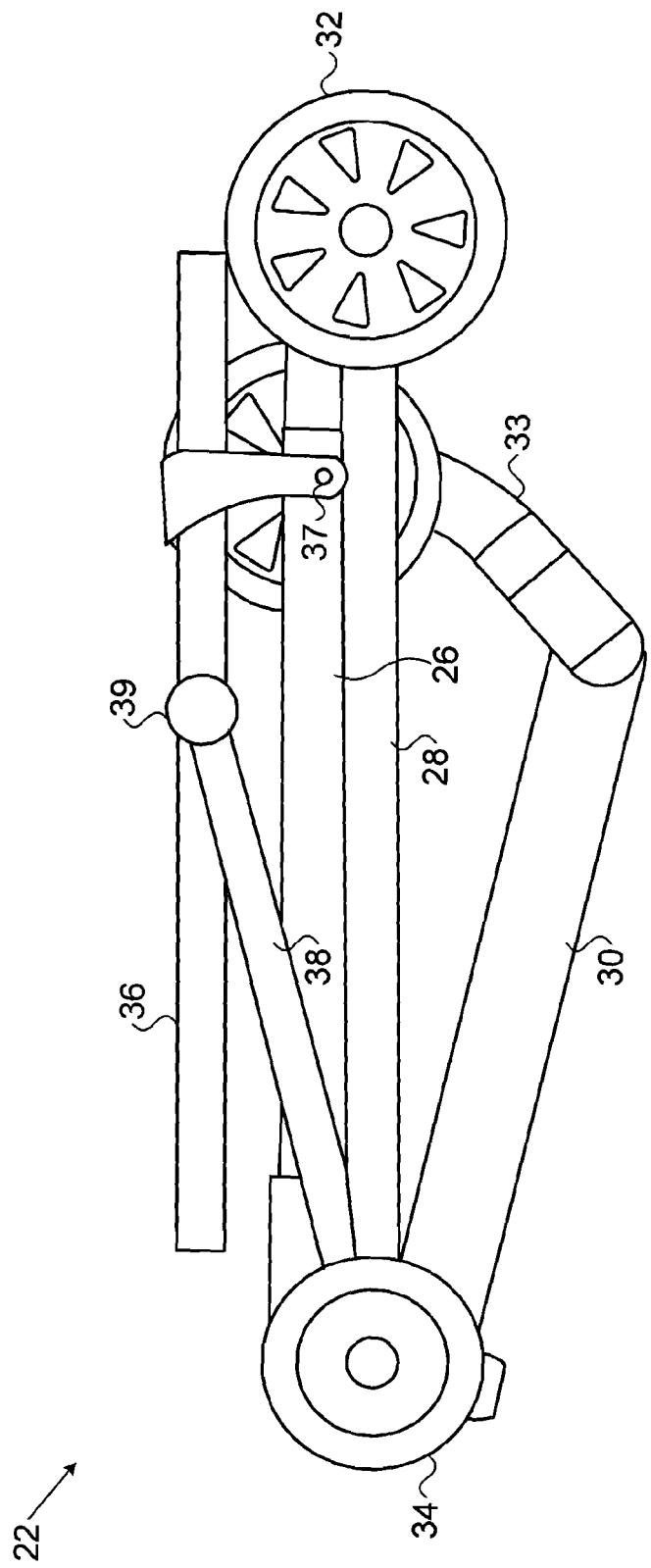

Rear supports 26 (along with the remainder of the collapsed upper supporting structure) then rotate downward to a position parallel to rear wheel struts 28, bringing the upper supporting structure into proximity with wheels 32, as shown in FIG. 2C. Finally, front wheel struts 30 rotate inward around joints 39, so that the front wheels are in proximity to the rear wheels, as shown in FIG. 2D. It can be seen in this figure that the largest dimension of frame 22 in this folded configuration is no greater than the length of wheel strut 28 plus the respective radii of joint 34 and wheel 32. For a full-size cart of the type shown in FIG. 1, this dimension may be approximately 73.5 cm, while the width of the folded cart (including the wheels) is approximately 61 cm, and the depth (between joint 39 and swivel 33 in FIG. 2D) is approximately 30 cm. The folded frame will thus fit easily inside the trunk of even a small automobile. These dimensions are noted solely by way of example, however, and larger or smaller-size carts may similarly be constructed.

Alternatively or additionally, joints 34 may be constructed to permit the upper supporting structure, together with the baskets, to be detached from wheel struts 28 and 30, or to permit the wheel struts to fold upward without first collapsing the supporting structure as illustrated above. In these sorts of configuration (not shown in the figures), the supporting structure with the baskets in it can be loaded into the vehicle as a unit, rather than removing the baskets from the frame as described above.

Various other features (not shown in the figures) may be added to cart 20 and to the other cart types shown below. For example, for use in bad weather, frame 22 may contain a hidden umbrella (possibly in handle 27) and/or a rain cover for baskets 24.

Embodiment II

Figure 3:
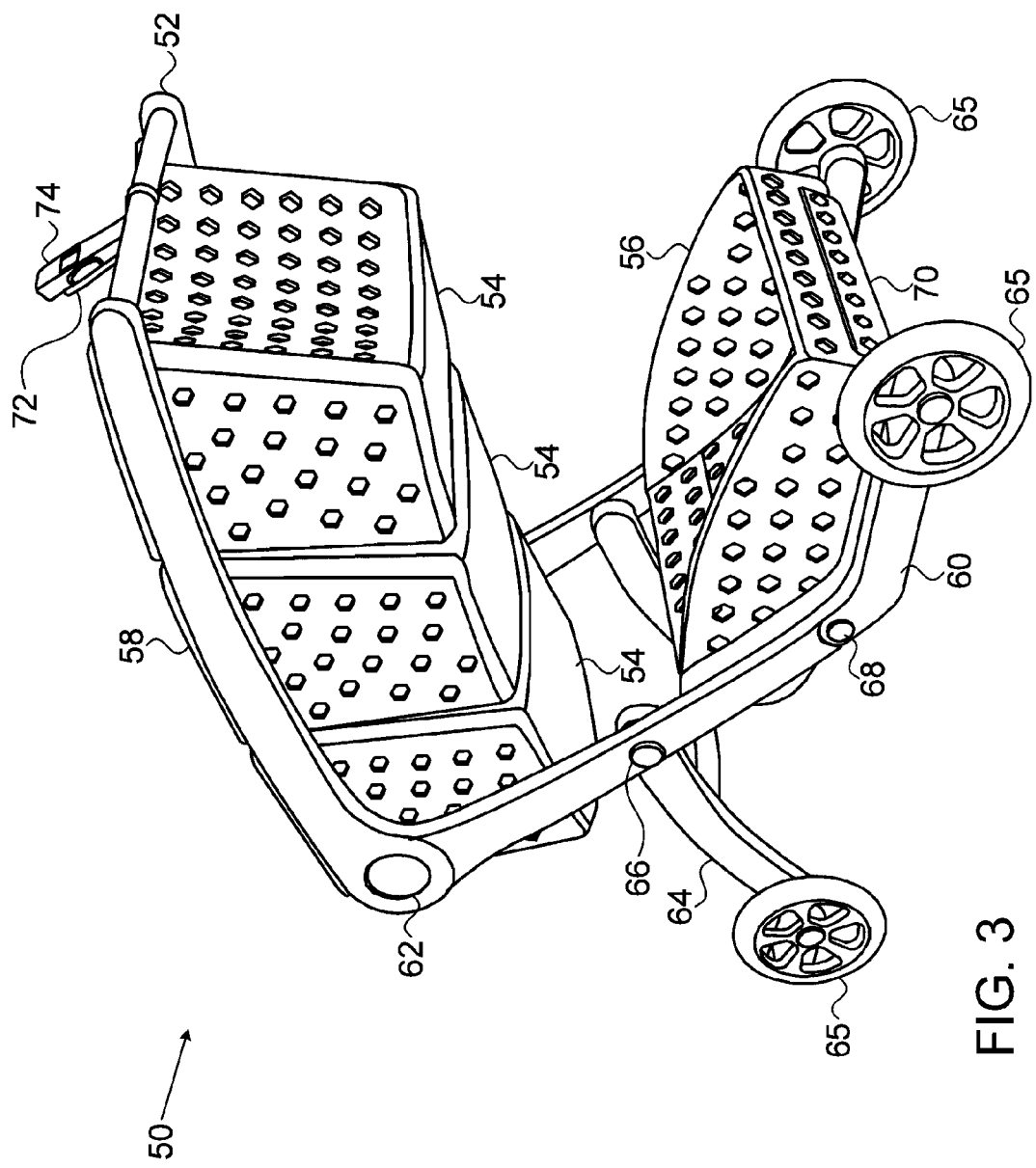
FIG. 3 is a schematic, pictorial illustration of a shopping cart, in accordance with another embodiment of the present invention.

FIG. 3 is a schematic, pictorial illustration of a shopping cart 50, in accordance with another embodiment of the present invention. As in the preceding embodiment, cart 50 comprises a foldable frame 52 and multiple removable baskets 54, which mount side-by-side on an upper supporting structure 58 of the frame. Cart 50 also comprises an additional removable basket 56, which mounts on a lower supporting structure 70.

Upper supporting structure 58 is coupled to a rear wheel strut 60 by a rotatable joint 62. A forward wheel strut 64 is coupled to rear wheel strut 60 by a lower joint 66, and the rear wheel strut includes a hinge 68 for compact folding, as shown in the next figure. Wheels 65 are attached to the lower ends of struts 60 and 64.

In this embodiment, frame 52 comprises a mount 72 for a mobile electronic device 74, such as a mobile telephone or a dedicated display device provided by the store in which cart 50 is being used. (A similar sort of mount and device may be used in the preceding embodiment, as well.) Device 74 receives information from transmitters in the store regarding goods sold in the store, and presents the information to the shopper using the cart. For example, the device may present advertisements, such as information regarding sale items, and particularly electronic coupons that the shopper may redeem against purchases. (Such electronic coupons are, of course, more environmentally-friendly than paper coupons, and they may offer a more compelling incentive to the shopper.) Alternatively or additionally, device 74 may be used to present an electronic shopping list and possibly to record items that the shopper loads into baskets 54 (either manually or automatically) in order to check them off the shopping list. This sort of recording function may also be used to facilitate the checkout process. As a further alternative, baskets 54 may present advertisements, via either print or electronic media, or may alternatively contain suitable electronic sensors for recording the items that have been loaded into them.

Figure 4:
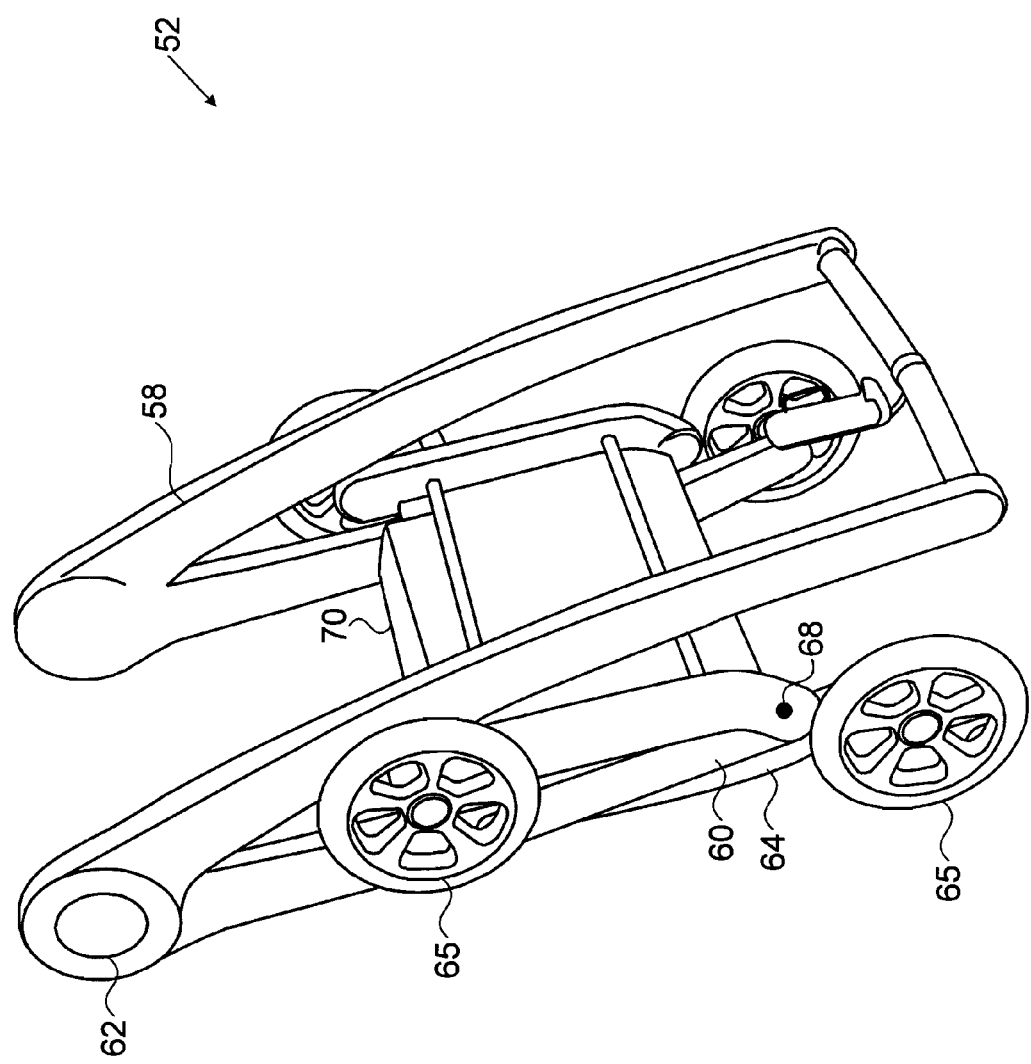
FIG. 4 is a schematic, pictorial illustration of a folded shopping cart frame, in accordance with an embodiment of the present invention.

FIG. 4 is a schematic, pictorial illustration showing frame 52 of cart 50 in its folded configuration, in accordance with an embodiment of the present invention. Joints 62 have been released and rotated so that upper supporting structure 58 is adjacent to wheels 65. Rear wheel struts 60 have been folded at hinges 68, and joints 66 (shown in FIG. 3) have been released and rotated to bring forward wheel struts 64 around parallel to rear wheel struts 60. The overall dimensions are similar to those of the folded frame 22 that is shown in FIG. 2D.

Figure 5B:
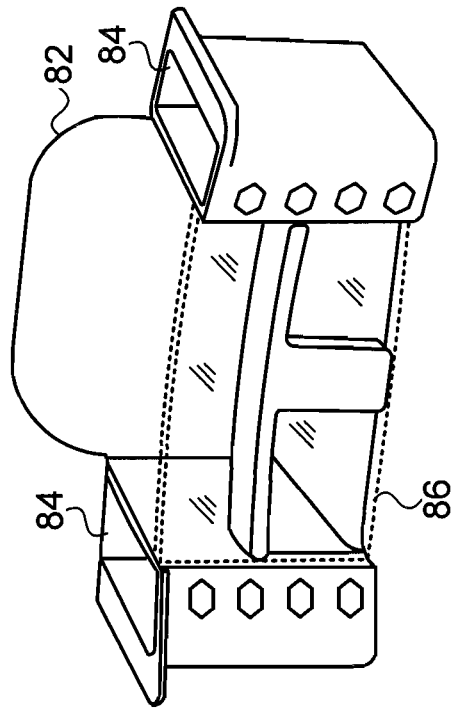
FIG. 5B is a schematic, pictorial illustration of an infant seat suitable for mounting on a shopping cart, in accordance with an embodiment of the present invention.
Figure 5A:
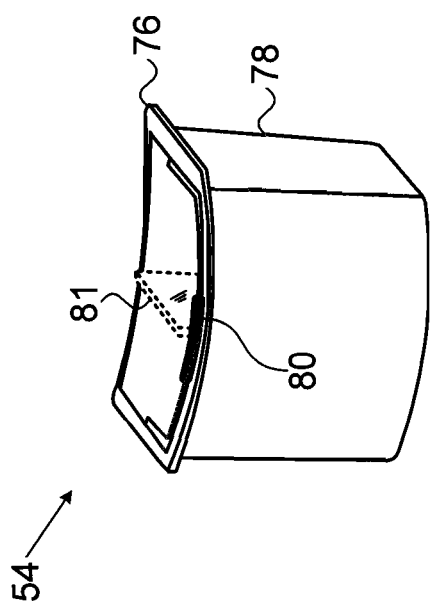
FIG. 5A is a schematic, pictorial illustration of a shopping basket, in accordance with an embodiment of the present invention.

FIG. 5A is a schematic, pictorial illustration of basket 54, in accordance with an embodiment of the present invention. As in the preceding embodiment, basket 54 comprises a container 78, with a rim 76 that mounts over the upper supporting structure of the frame. A handle 80 may be used to carry basket 54 in the store, as well as in loading and unloading the basket into and out of the shopper's vehicle. This handle is an optional feature, and the baskets may alternatively have other types of handles (such as handles 44 of baskets 24 in FIG. 1) or no handles at all. As noted above, containers 78 and rims 76 may be rigid, as shown in FIG. 5A, or they may alternatively be flexible and/or foldable. Additionally or alternatively, containers 78 may be subdivided into compartments by internal partitions 81, which may be either fixed or removable.

FIG. 5B is a schematic, pictorial illustration of an infant seat 82 suitable for mounting on a shopping cart, in accordance with an embodiment of the present invention. For example, seat 82 may be mounted on frame 52 in place of the rightmost basket 54 shown in FIG. 3. Seat 82 in this embodiment comprises side compartments 84 for holding goods or infant supplies, for example. Seat 82 may also comprise a removable panel 86, which is removed when an infant is to sit in the seat but may be inserted in order to convert the seat to a closed container for use as an additional basket when needed. Frame 52 (as well as the frames in the other pictured embodiments) can similarly accommodate other types of special-purpose carriers and containers, in addition to or instead of baskets 54.

Embodiment III

Figure 6:
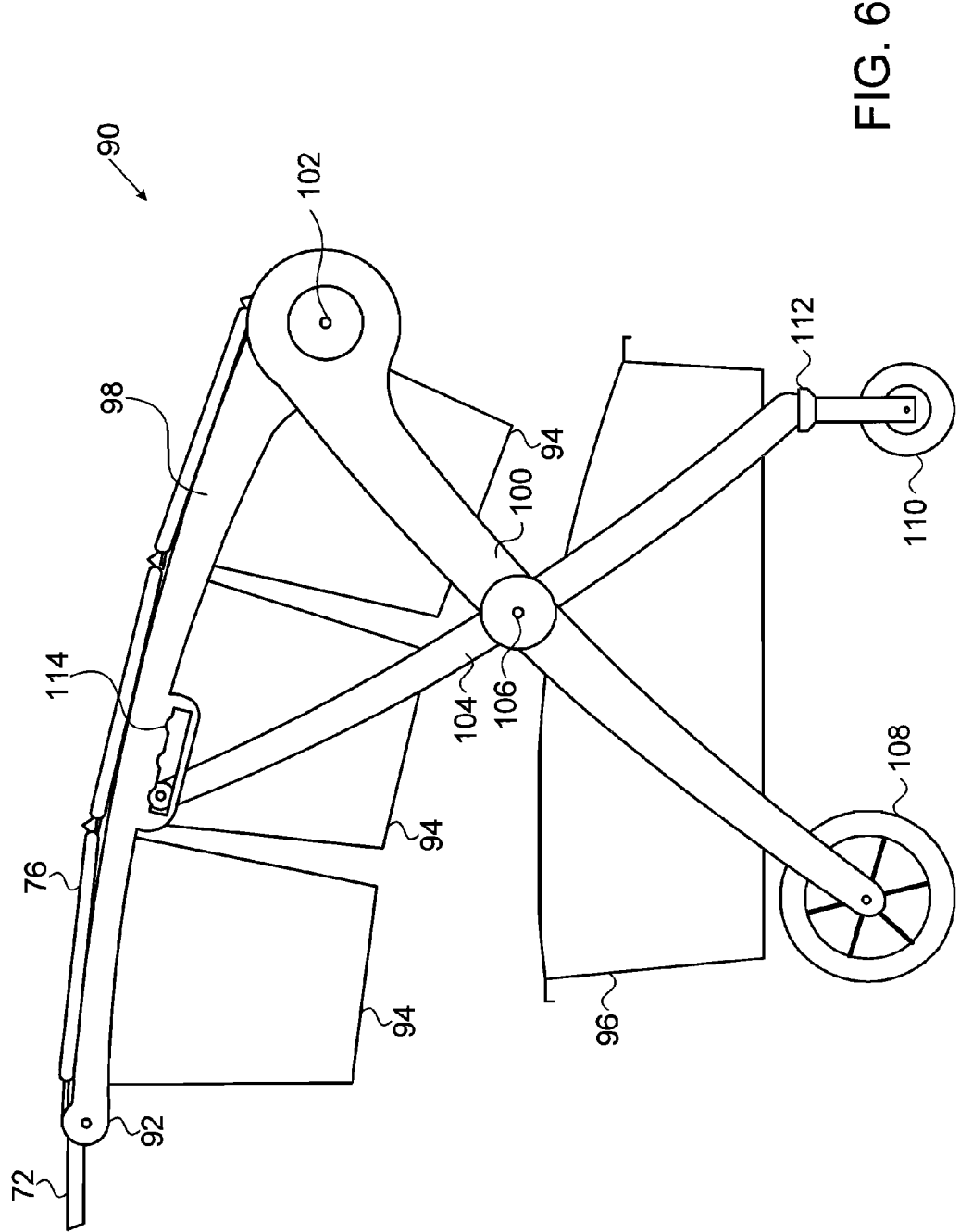
FIG. 6 is a schematic side view of a shopping cart, in accordance with yet another embodiment of the present invention.

FIG. 6 is a schematic side view of a shopping cart 90, in accordance with yet another embodiment of the present invention. As in the preceding embodiment, cart 90 comprises a foldable frame 92, which supports multiple baskets 94, mounted by their respective rims 76 on an upper supporting structure 98, along with an additional lower basket 96. A rear wheel strut 100 is coupled to structure 98 by a joint 102, while a forward wheel strut 104 is coupled to the rear wheel strut at a lower joint 106. Rear wheels 108 and forward wheels 110 are coupled to the lower ends of the respective struts, with swivels 112 on the forward wheels for easy steering. An adjustable catch 114 holds the upper end of forward wheel strut 104, with a number of different catch positions to enable the shopper to adjust the height of cart 90 as desired.

Figure 7:
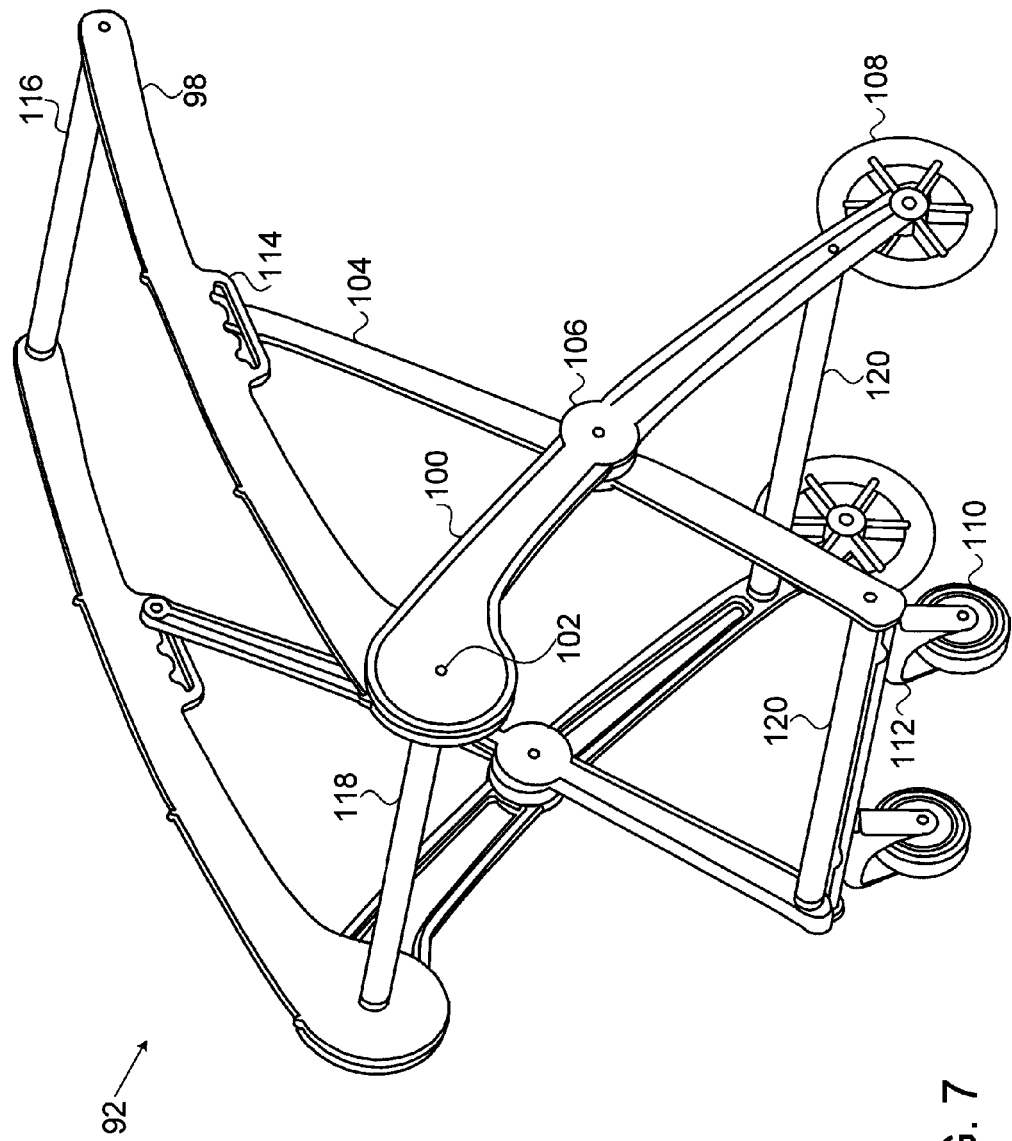
FIG. 7 is a schematic, pictorial illustration of a shopping cart frame, in accordance with an embodiment of the present invention.

FIG. 7 is a schematic, pictorial illustration showing further details of frame 92, in accordance with an embodiment of the present invention. A handle 116 and an end bar 118 at opposite ends of upper supporting structure 98 can help to hold baskets 94 in place, notwithstanding the tilt of the supporting structure. Lower crossbars 120 between the wheel struts add stability and form a lower supporting structure for basket 96.

Figure 8:
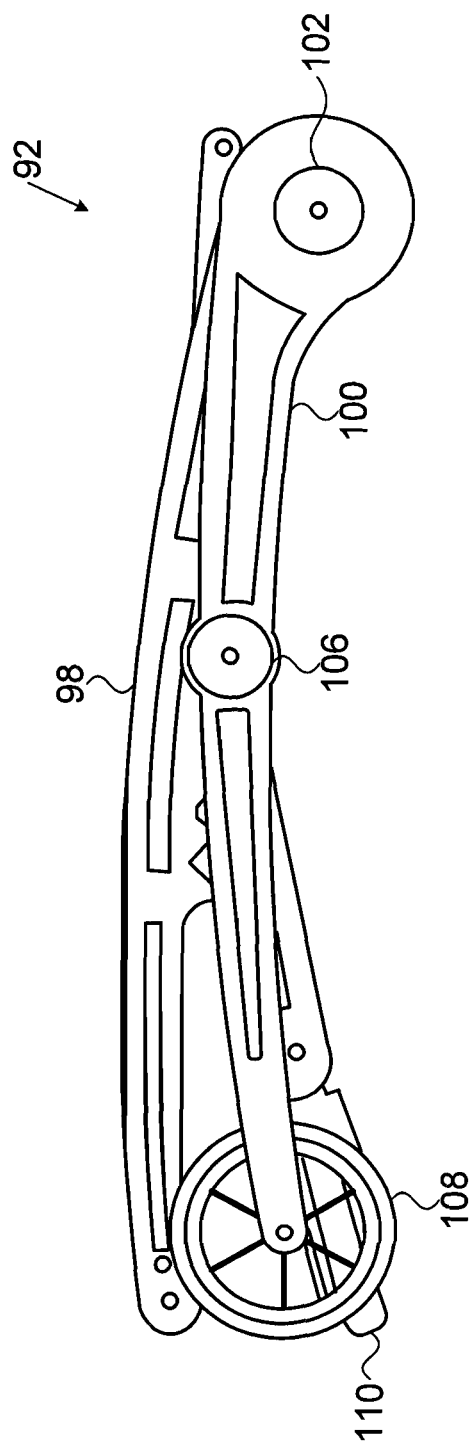
FIG. 8 is a schematic side view of a folded shopping cart frame, in accordance with an embodiment of the present invention.

FIG. 8 is a schematic side view of frame 92 in its folded configuration, in accordance with an embodiment of the present invention. Catch 114 (as seen in FIGS. 6 and 7) has been released, and joints 102 and 106 have been released and rotated to bring wheel struts 100 and 104 around parallel to upper supporting structure 98, with wheels 108 and 110 in proximity to the upper supporting structure. In this embodiment, as in the embodiment shown in FIG. 2D, the maximal dimension of the folded frame is no greater than the length of wheel strut 100 plus the respective radii of joint 102 and wheel 108.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A cart, comprising:
    a plurality of removable baskets having respective rims; and
    a foldable frame, which has folded and unfolded configurations, and which comprises:
        front and rear wheels;
        an upper supporting structure capable, when the frame is in the unfolded configuration, of supporting the baskets side-by-side by the respective rims;
        a handle extending from a rear side of the upper supporting structure;
        front and rear wheel struts, having lower ends connected to the front and rear wheels, respectively, and having upper ends opposite the lower ends; and
        a joint, which couples the upper supporting structure to the upper ends of the wheel struts,
    wherein the frame is configured to fold about the joint so as to bring the wheels into proximity with the upper supporting structure and the handle, and
    wherein both the front and rear wheel struts are configured to rotate about the joint as the cart is folded so as to bring the front wheels into proximity with the rear wheels in the folded configuration, and
    wherein the upper supporting structure is hinged so as to collapse toward the joint as the cart is folded.

2. The cart according to claim 1, wherein the frame in the unfolded configuration is capable of supporting three or more of the baskets side-by-side by the respective rims.

3. The cart according to claim 1, wherein the baskets comprise handles for use in carrying the baskets when removed from the frame.

4. The cart according to claim 1, wherein at least one of the baskets comprises a removable partition, which divides the at least one of the baskets into two or more compartments.

5. The cart according to claim 1, and comprising an infant seat configured to be supported by the frame in place of one of the baskets.

6. The cart according to claim 5, wherein the infant seat comprises a removable panel, which is configured to be inserted into the infant seat in order to convert the infant seat to a closed container for use as an additional basket.

7. The cart according to claim 1, wherein the at least one wheel strut has a length from the upper end to the lower end, and wherein the joint and the at least one of the wheels have respective radii, and
    wherein the frame is configured to fold about the joint so as to have a maximal dimension in the folded configuration that is no greater than the length of the at least one wheel strut taken together with the respective radii of the joint and at least one of the wheels.

8. The cart according to claim 1, wherein the at least one wheel strut comprises a hinge, in addition to the joint, for rotating at least a part of the at least one wheel strut between the folded and unfolded configurations.

9. The cart according to claim 1, wherein the frame comprises a lower supporting structure, which is configured to hold at least one additional removable basket below the upper supporting structure.

10. The cart according to claim 1, wherein the frame comprises a mount for a mobile electronic device, for providing information to a user of the cart in a store regarding goods sold in the store.

11. The cart according to claim 1, wherein the rims of the baskets are foldable.

12. The cart according to claim 1, wherein the upper supporting structure comprises a rear support, which connects to the joint and from which the handle extends rearward, and a pair of crossbars, which are connected by a hinge to the rear support so as to collapse toward the rear support as the cart is folded.

13. The cart according to claim 12, wherein the baskets are supported by their rims between the pair of the crossbars.

* * * * *